United States Patent [19]

Weigelt

[11] Patent Number: 5,140,740
[45] Date of Patent: Aug. 25, 1992

[54] METHOD OF RETROFITTING A STATOR END WINDING

[76] Inventor: Klaus Weigelt, Postfach 1132, 7897 Kadelburg, Fed. Rep. of Germany

[21] Appl. No.: 627,001

[22] Filed: Dec. 13, 1990

[30] Foreign Application Priority Data

Dec. 15, 1989 [CH] Switzerland .......... 4515/89

[51] Int. Cl.$^5$ .......... H02K 15/14
[52] U.S. Cl. .......... 29/596; 310/216
[58] Field of Search .......... 29/596, 598; 310/260, 310/270

[56] References Cited

U.S. PATENT DOCUMENTS

| 4,126,799 | 11/1978 | Iogansen et al. | 310/260 |
| 4,488,079 | 12/1984 | Dailey et al. | 310/260 |
| 4,525,642 | 6/1985 | Humphries et al. | 310/260 |
| 4,563,607 | 1/1986 | Cooper et al. | 310/260 |
| 4,808,873 | 2/1989 | Rowe et al. | 310/260 |

FOREIGN PATENT DOCUMENTS 0309096 8/1988 European Pat. Off. .
6364695 2/1983 Switzerland .

Primary Examiner—Carl E. Hall
Attorney, Agent, or Firm—Louis Weinstein

[57] ABSTRACT

A stator end-winding system is proposed in which the bars of the winding are bent outwards and describe a hollow cone. The supporting proceeds by a wedge-like braced inside ring, a segmented outside ring and supports which also have a wedging effect. The bracing of the inside ring and outside ring is made by tie rods, the outside ring being azimuthally tensionable. Therefore, it can be placed over the above-mentioned cone described by the bars without the necessity of disassembling the stator end-winding system.

19 Claims, 3 Drawing Sheets

METHOD OF RETROFITTING A STATOR END WINDING

BACKGROUND OF THE INVENTION

1. Field of the Invention

The present invention relates to a stator end-winding system of the stator of an electric machine having a array of bars expanding coaxially to the axis of the machine at its end areas in the shape of a hollow cone, and having a means for supporting same including an inside-ring which extends cone-like along a substantial axial portion of the cone-shaped array of bars. It relates also to a retrofitting set for a stator end-winding support system of an electric machine having a array of bars expanding outwards coaxially to the axis of the machine at its end areas in the shape of a hollow cone. It relates further to a method of retrofitting a stator end-winding system of an electric machine having an array of bars expanding outwards coaxially to the axis of the machine at its end areas in the shape of a hollow cone, and a support system for same which includes supporting members located at the inside and outside relative to the cone-shaped array of bars.

The high dynamic forces acting during the operation at locations of resonance of the mechanical stator end-winding system of stator end-windings and the problems resulting therefrom, specifically in the case of large electrical machines, specifically of turbo-generators with a directly hydrogen-cooled stator winding, are generally known. The appearance of exciting forces of specific frequencies can not be influenced at a given operation wherewith it is endeavoured to move the locations of resonance of the mechanical stator impedance as much as possible away from the exciting frequencies occuring during the operation. In operation, operational vibrations, specifically in the case of resonance, lead to high dynamic stresses of the end-windings, specifically in case of turbo-generators, which may lead to a loosening of the entire stator winding assembly. Abrasions of insulation and damages at the stator and the results thereof lead in turn to long shut-down times for a repair of the stators. Due to the known direct hydrogen cooling of the stator winding of generators the number of slots of the stators is kept as low as possible resulting in large dimensions of the bars of the stator and accordingly in large masses. Because the dynamic forces are proportional to the masses acted upon, aside from the acceleration of the vibrations, accordingly high stresses are the result, specifically of the end-winding assembly. Accordingly, there exists on the one hand the problem in the case of the known stator end-winding systems to be able to absorb the large dynamic forces. On the other hand such stator end-winding systems, also if they have been improved regarding dynamic stresses, must be subjected from time to time to maintenance work whereby the generally complicated and, regarding the maintenance, difficult structural designs of stator end-winding systems lead to corresponding shut-down times: A repair of most of the known stator end-windings means a new winding of the stator.

2. Description of the Prior Art

The U.S. Pat. No. 4,488,179 discloses a stator end-winding system, specifically of a turbo-generator, including an array of bars expanding outwards coaxially to the axis of the machine at its end areas in the shape of a hollow cone and a supporting system for same. The supporting system includes a plurality of rings located inside of the hollow cone formed by the array of bars, and at the outside a massive conically extending outside ring. The bars of the winding are braced therebetween by means of tie rods and intermediate rings. The outer massive ring is, furthermore, axially anchored at the stator body. Due to the generally used cone-shaped array of the bars which expands axially towards the outside it is not possible to revise or repair, respectively the stator end-winding support system without a dismounting of the bars which means a new winding of the stator. Furthermore, a plurality of weakly dimensioned inside rings lead to a merely low stiffness or rigidity, respectively of the stator end-winding unit because the bracing forces act more or less only along straight lines and do not act uniformly at the cone of the stator bars.

The U.S. Pat. No. 4,525,642 discloses a stator end-winding again with an array of bars expanding conically outwards and an anchoring between the body of the stator and the outer support of the bars at the stator end-winding in order to absorb thermally caused expansions between the arrangement of bars and the body of the stator.

U.S. Pat. No. 4,563,607 discloses a stator end-winding again with an array of bars expanding outward coaxially to the axis of the machine at its end areas in the shape of a hollow cone and a support for same as well, which latter, located at the inside includes clamps extending under the bars and holding same and being radially braced to upper plates which are anchored at the body of the stator and are substantially axially aligned. The plates and the clamps are braced together by means of bracing rings located between the bars of the bar array. The support is mounted to the stator body. The small masses of the inner and outer members used here for the support and braced against each other have a negative effect upon the damping of the resonance behaviour of the stator end-winding such that, together with the line-contact bracing only a unsufficient rigidity of the stator end-winding is achieved.

U.S. Pat. No. 4,808,873 discloses basically to insert a suitable padding material between the bars of the array of bars.

The European Patent document EP-A-0 309 096 discloses further to forsee an outer support in the form of an outer ring at a stator end-winding having again a array of bars expanding in the form of a hollow cone in order to embrace the bars by tensioning bands extending from said outer ring. Again, due to the small installed supporting masses and line-contact like bracings the resonance behaviour of this stator end-winding is unsatisfactory due to the lack of rigidity. Additionally, due to the fact that the ring is displaced axially inwards from the largest outer diameter of the cone of the arrangement of bars a revision of the stator end-winding is not possible but rather only a disassembly along with at least a partial removal of the bars.

Now, the Swiss Patent Specification 634 695 discloses a stator end-winding of an electric machine having an array of bars expanding outwards coaxially to the axis of the machine at its end areas in the shape of a hollow cone, whereby a support is provided which includes an inside ring which extends cone-like along a substantial axial portion of the cone-shaped array of bars, and includes an outside ring system at the end of the arrangement of bars which is radially braced onto the inside ring by means of tie rods via the array of bars. In order to make the maintenance activity of the stator end-winding easier in spite of the forseen outside ring, i.e. to remove the inside ring and outer ring without having to disassemble the array of bars itself, the outside ring is located directly in the area of a bracket portion interconnecting the inner and outer bars, which bracket portion defines at the end area of the cone substantially a cylindrical surface such that, after the unscrewing of the tie-rods, the outside ring located at the end area can be pulled off. The outside ring and the inside ring as well are, however, additionally locked axially such that a disassembling remains relatively cumbersome. In order to benefit by a simpler disassembling procedure after all the relatively weakly dimensioned outside ring is arranged in such a manner at the cylindrical end area portion of the arrangement of bars that the radial bracing with the inside ring proceeds only at the end area of the bars, the axially much longer cone-shaped portion of the array of the bars is not braced further up to the body of the stator or core, respectively. The result thereof is a only limited rigidity of the stator end-winding system in spite of the massive inside ring.

SUMMARY OF THE INVENTION

It is an object of the present invention to provide a stator end-winding system of the kind mentioned above which is less prone to vibrations or oscillations, respectively, i.e. to design it more rigid.

A further object is to provide a stator end-winding system in which the inside-ring is braced axially into the array of bars which expands in the shape of a hollow cone.

A further object is to provide a rigid interconnection inside ring/outside support elements by bracing the inside ring wedge-like axially in the hollow cone described by the bars. Accordingly, on as high as possible rigidity of the stator end-winding system shall be arrived at in order to raise the resonance frequencies of this system above exciting frequencies occuring during the operation of the electrical machine at base frequencies of 50 or 60 Hz usually predominantly at their first harmonic frequencies, namely 100 and 120 Hz., respectively.

Still a further object is to provide a stator end-winding system which is easy to disassemble and to assemble without having to remove the bars of the winding in that an outer support system is provided which includes at least one segmented ring or supporting bars extending substantially in the aximuthal direction.

Yet a further object is to provide a stator end-winding in which an outer support system includes an outside ring system in the region of the outer side of the array of bars which converges cone-like inwards such as to arrive at a bracing of the array of bars along the plane of the cone formed by the bars over a large surface or plane respectively by means of which the rigidity of the stator end-winding system is increased considerably, and in which the outer ring system is, furthermore, azimuthally and/or radially tensionable such that it nevertheless can be slid in its entirety over the end area of the array of bars having the largest diameter without disassembling the stator-end winding or disassembled therefrom and thereafter be fixedly braced at an area of the reduced cone diameter, by a radial pull and/or azimuthal tensioning.

A further object is to provide a stator end-winding wherein the inside ring acts upon the array of bars in a wedge-like fashion and is axially braced by tie-rods extending oblique-angled inclined and axially inwards relative to its cone surface such that the axially acting tension also excerted by the tie-rods will brace the inside ring axially against the stator body. The wedge action shall be, thereby, adjustable by an increase or decrease, respectively of the tension of the tie-rods and accordingly the rigidity of the stator end-winding system.

Yet a further object is to provide a stator end-winding comprising an outside-ring system which acts via a conical tension surface arrangement upon the outer side of the cone-shaped array of bars and acts in a wedge-like fashion upon the array of bars by means of tie-rods inclined axially oblique-angled and outwards relative to the tension surface, such that the wedge principle at the cone-shaped array of bars is consequently made use of for the outer ring system in that it acts via a conical bracing surface system upon the outer side of the conical array of bars and acts wedge-like upon the array of bars by tie-rods which are axially inclined outwards relative to the above-mentioned surface.

A further object is to provide a stator end-winding system which is optimally rigid by means of two wedge arrangements, namely an inside wedge formed by an inside ring and an outside wedge formed by an outside ring system which wedges are braced (i.e., urged) by means of the tie rods against each other.

Yet a further object is to provide a stator end-winding system in which the inner ring is held substantially only by means of tie-rods, apart from an axial locking relative to the winding such as e.g. achieved by means of a cord. Bearing in mind that either an outer support or the inside ring system is to be axially anchored at the body of the stator it becomes obvious that due to the accessability this must be realized at the outside ring support and thus the inside ring is mounted such as set forth above.

Still a further object is to provide a stator-end winding system including an outer support system which has at least one tensionable outside ring which is substantially held only by means of tie-rods such that the tensioning of the outer ring system can be made independently from the axial anchoring of the outer ring system.

Yet a further object is to provide a stator end-winding system which comprises an outer support system which includes at least one outside ring having two, or preferably three or more azimuthally and/or radially braceable ring segments which may be detached from each other, such that the outside ring can be placed in form of segments which are separated from each other over the outer cone of the array of bars and thereafter the segments can be connected to each other and finally be azimuthally tightened around the stator bar cone. Alternatively thereto, the segments may be tightened only radially inwards. The tightening of the segments proceeds preferably by an azimuthal screwing and/or by radial anchors.

A further object is to provide a stator end-winding system including a support in form of a hollow cone having substantially an axial extent corresponding to the axial extent of the cone-shaped array of bars, via which outer support system as the outer ring system rests on the outer surface of cone-shaped array of bars, such that a uniform bracing of the array of bars is produced over large areas of the cone surface: The support distributes the forces e.g. generated by the tie-rods uniformly over the above-mentioned cone surface. It is thereby preferred to insert one or more preferably padded rings between the support and the bars of the winding located adjacent of same.

Still a further object is to provide a stator end-winding system in which an outer ring system is anchored preferably via rigid connectors and/or connectors having spring members and/or guide members to the body of the stator such that either within the scope of the elasticity of the material of the rigid connectors which are designed accordingly or within the scope of the spring action of the spring members or slidable, an axial, thermally caused shifting between the bars and the body of the stator is made possible without producing stresses thereon which are too high.

Yet a further object is to provide a stator end-winding system in which the bars, the inside ring, and an outer support of the stator end-winding system are at least partially mutually cast in and/or padded and/or provided with cords and braced together.

A further object is to provide a stator end-winding system having a basic design which allows an easy disassembling of the end-winding system in order to be mounted upon maintenance and repair work at known existing stator end-windings having an array of bars which expand at the end areas coaxially to the axis of the machine outwards.

Thus, a further object is to thereto provide a retrofitting set for such a stator end-winding system which includes an axially braceable inside-ring having a conical outer surface and corresponding to at least a substantial portion of the inner cone formed by the above-mentioned array of bars.

A further object is to provide for such retrofitting set an at the outside conical and axially braceable ring and possibly an azimuthally and/or radially braceable outer support to allow a repair of a stator end-winding system rapidly and without long down-times, with further help of further known structural members such as tie-rods, intermediate bracing rings, material for a casting-in, for padding and applying of cords, etc.

Still a further object is to provide a method of retrofitting a stator end-winding system of a known or of the inventive design wherein the originally forseen existing support system for the bars of the stator is at least partially removed, at least one inside ring which has a conical-shaped outer surface corresponding to at least a substantial portion of the inner cone of the array of bars is inserted into the array of bars and braced axially. Preferably, furthermore, an azimuthally and/or radially tensionable outer support system is placed over the outer surface of the array of bars and is further preferably braced via tie-rods to the inside ring and in itself azimuthally and/or radially.

A further object is to provide a retro-fitting method according to which rigid connectors and/or connectors with spring members or slidable connectors for an outer support system, preferably an outer ring system are mounted to the stator body which latter allows an axial displacement between the stator body and the outer support system, may such be within the scope of the elasticity of the material, of the rigid connectors or within the scope of the spring properties or then slidable.

A further object is to provide a method wherein an outer support system is provided which is mounted in a padded fashion to the array of bars and where preferably the interstices between forseen upper and lower bars are at least partly padded and the bars are preferably additionally supported by filler materials and or cords.

Still a further object is to provide a method wherein pads and/or a filler material are built in at the stator-end winding and are impregnated with resin prior to the bracing of at least the inside ring and wherein preferably an outer support system preferably in the form of an outer ring system and secured by cords is provided.

Yet a further object is to provide a method wherein prior to the retro-fitting and preferably also thereafter the state of the stator end-winding system is controlled regarding its resonance behaviour by means of a modal analysis and its resonance behaviour is adjusted by a further tensioning or a change of the tension.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
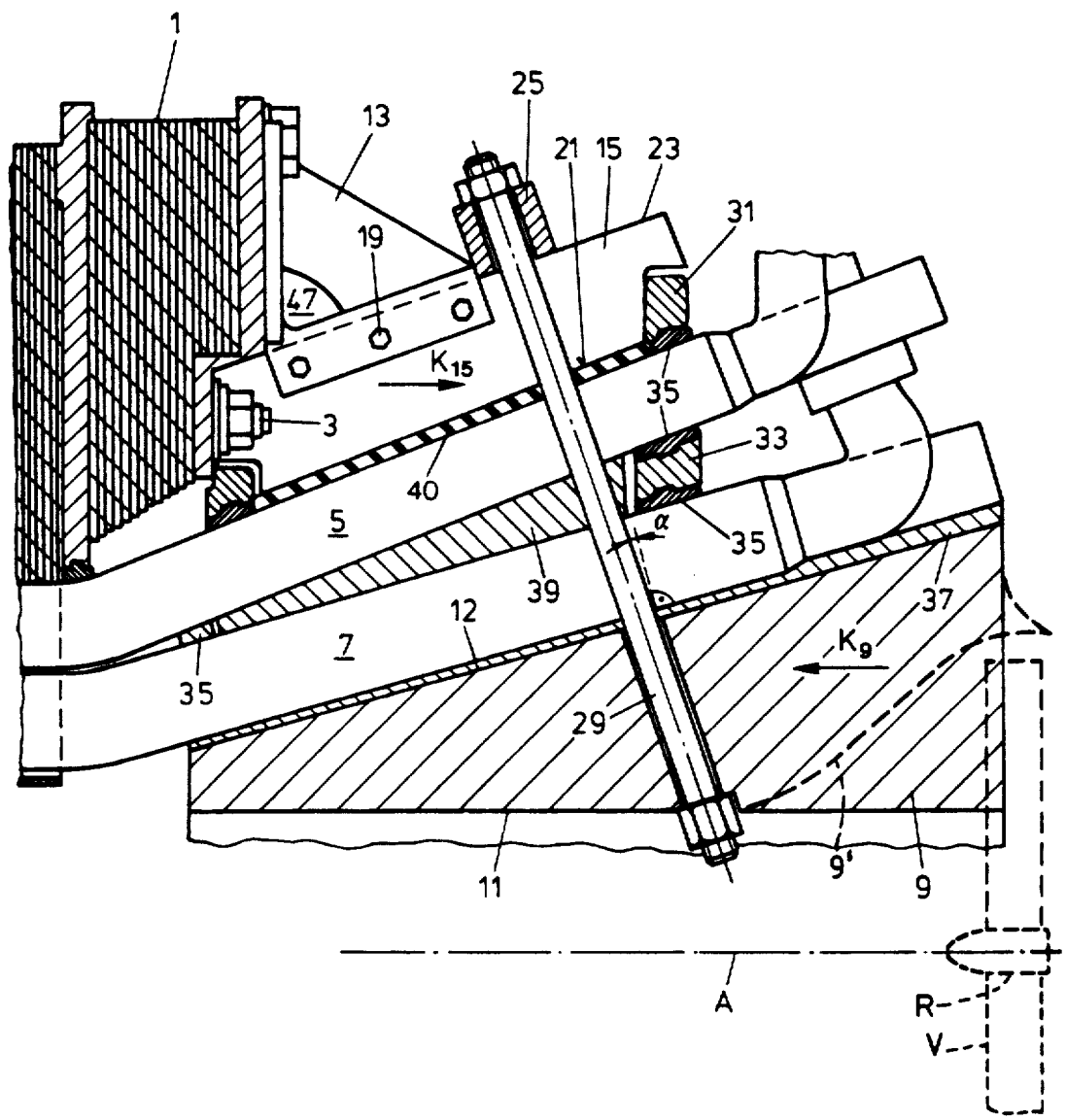
FIG. 1 is a radial section through a stator end-winding system in accordance with the present invention.

The portion of a stator illustrated in FIG. 1, for instance a stator of a turbo-generator includes, according to known designs, a stator core 1 bolted by through bolts 3 extending coaxially to the merely schematically designed machine axis A. The outer bars 5 of the winding and the inner bars 7, respectively thereof are located in the core 1 of the stator.

These bars project at the front ends out of stator body 1 and are bent outwards in radial planes extending through the machine axis A such that they form in their entirety an array of bars having the form of a hollow cone around the machine axis A. According to the present invention now an inside ring 9 is provided which includes a cylindrical inner surface 11 and a conical outer surface 12. The outer cone surface 12 describes relative to the machine axis A at least approximately the same cone angle which the inner bars 7 describe relative to the above-mentioned axis A, and possibly a somewhat larger angle. The cone surface 12 of the inside ring 9 includes preferably no radial recesses or projections except possibly a grooving or similar means for holding a filler material wherewith the inside ring 9 can be slidingly inserted in a wedge-like manner into the open cone-shaped region as formed by the inner bars 7 and be axially braced therein. The inside ring 9 is preferably made of an electrically non-conductive or at least poorly conductive material such as a glass-fibre reinforced plastic material. Further, the inside ring may be formed as one piece or may be composed of a plurality of assembled pieces.

The illustration in broken lines in FIG. 1 indicates that possibly a ventilator V may be arranged on the shaft of the rotor R in the general area of the stator end-winding; in such case the end portion of the inside ring 9 may be designed as having a gas guiding arrangement 9, for the flow of the cooling gas, such as e.g. the outer casing of the ventilator.

Bracket plates 15 located outside of the cone-shaped surface described by the bars as illustrated in FIG. 1 are anchored by means of screw bolts at the body 1 of the stator via angle members 13. The bracket plates 15 themselves are bolted to the angle members 13 by means of screw bolts 19. The bracket plates 15 cover one or more bars 5, 7 of the winding seen in axial and azimuthal direction and describe, relative to the outer bars 5 by means of their inner surfaces 21 a cone-shaped surface which extends substantially parallel to the cone-shaped surface described by the outer bars 5. The aperture angle of the surfaces 21 is possibly smaller than the aperture angle of the cone described by the outer bars 5. An outside ring 25 which in the assembled state is a continuous embracing ring rides on the radially outer supporting surfaces 23 of the bracket plates 15.

Figure 2A:
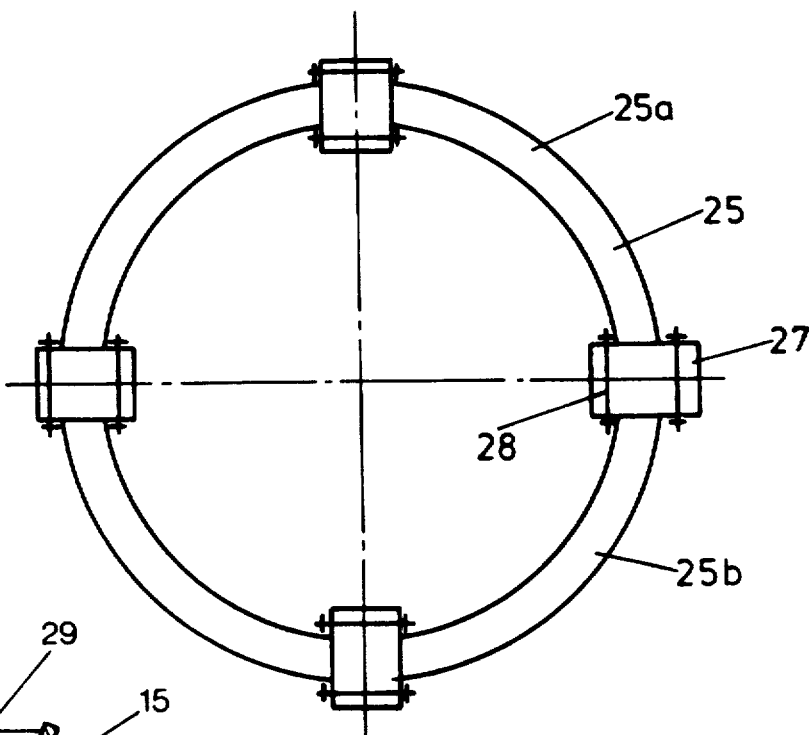
FIG. 2a is a schematic top view of an outer ring for the explanation of the azimuthal tensioning property of the outer ring system of FIG. 1.

According to the schematic illustration in FIG. 2a the outer ring 25 can be tensioned in the azimuthal direction and according to a simple embodiment in accordance with said FIG. 2a it consists of at least two, and preferably three or more segments of a circular ring 25a, 25b etc. which are interconnected via the bracket plates 15 forming a portion of the outer ring system by means of connectors 27 and azimuthally acting tightening screw bolts 28 designed in FIG. 2a and are braced azimuthally.

Figure 2B:
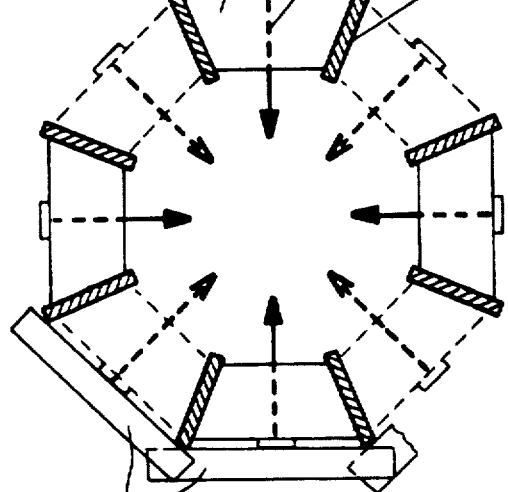
FIG. 2b is an illustration analogue to FIG. 2a for radially tensionable outer support members.

In certain cases the outer support system having the azimuthally braceable outside ring 25 may be replaced by an outer support system of a plurality of bracing bars resting at both sides e.g. on or between bracket plates 15 which bracing bars are individually braced radially by tie rods 29 or it is possible to forsee a ring of such individual elements 25 which are radially braced by tie rods 29 in accordance with FIG. 2b. In such case the segments 25c must not form an encircling ring, such as illustrated by broken lines. The segments as shown at 25d may also rest on top of plates 15 and be axially staggered.

It shall be noted here distinctly that the end-winding can be structured in accordance with the invention and depending from the demands of the machine such as follows:

Inside ring with tie rods and azimuthally braceable outer ring. Basic variant.
Inside ring without tie rods, only with azimuthally braceable outer ring.
Inside ring with outside ring of lateral bars which can not be braced azimuthally. Lateral bars and inside ring are braced by tie rods.
Only inside ring which is pressed in and is locked with axial prestressing without outside ring 25 and without tie rods.
In each variant the inside ring is locked relative to the windings.
The inside ring can be made of a homogeneous piece or be assembled of pieces which are glued and/or bolted together.
In the case of smaller generators the long inside ring may be replaced by two smaller rings which are not connected together.

According to the basic variant illustrated in FIG. 1 the tie rods 29 are forseen between the bars 5 and 7 of the outer winding and of the inner winding which are braced by means of tightening nuts at the one hand at the outer ring 25 and at the other hand at the inside ring 9. The tightening nuts may thereby be preferably sunk into the inside and/or outside ring.

In relation to the vertical direction onto the coaxial and substantially parallel and each other facing planes at the one hand of the inside ring and at the other hand described by the inner bars 7, the tie rods 29 are inclined towards the body 1 of the stator such as illustrated by a, such that the tie rods 29 exert a wedging pulling action upon the inside ring 9. In certain embodiments the angle a is selected such that also the axis of the tie rods 29 are inclined in relation to the coaxial cone surfaces facing each other, at the one hand described by the bracket plates 15, at the other hand by the outer bars 5 out of the vertical direction and away from the stator core 1 wherewith the outside ring 25 and the bracket plates 15 are tensioned towards the outside in a wedge like fashion. The axial bracing force of the inner ring 9 towards the inside is marked in FIG. 1 schematically by $K_9$ and the bracing force of the bracket plates 15 towards the outside by $K_{15}$.

In accordance with the illustration the bracket plates 15 transmit the forces produced by the tie rods 29 preferably via two or more rings 31, filler and/or padding material 40 uniformly onto the outer bars 5, the latter via one or more rings 33 onto the inner bars 7 which abut the inside ring 9 along practically their entire length bent outwards. Paddings 35 and filler pieces 40 are forseen between the bracket plates 15, the encircling rings 31 and the outer bars 5 of the winding, and also between the ring 33 and the inner and outer bars 5 and 7, respectively. A further padding 37 is forseen between the conical outer surface 12 of the inside ring 9 and the inner bars 7. A padded insert 39 is located between the inner and the outer bars 5 and 7, respectively.

The bracket plates 15, the tie rods 29 with the tightening nuts consist preferably of an electrically non-conducting material or, specifically latter of insulated, electrically poorly conducting steel.

When performing maintenance or repair of the stator end-winding system with a stator body 1 and cone-like outwardly bent bars of the winding analogous to the illustration of FIG. 1 the actual state of the original winding is analyzed by a modal analysis with regard to the resonance behaviour. Thereafter the original means forseen for anchoring the bars at the stator end winding system are completely or partially removed. If necessary, new or modified connecting members 13 are mounted onto the body 1 of the stator, if necessary the bracket plates 15 are replaced or then the originally forseen connectors and/or bracket plates are used again. Prior to this the rings 31, 33 were equipped with the corresponding padding. Thereafter, the segmented outside ring 25 is assembled over the bracket plates 15, the filling inserts 39 padded, placed as an intermediate layer between the outer and inner bars are 5, 7 and these bars then supported further by filling material and cords.

Thereafter, the inside ring 9 inclusive of the padding 37 is inserted and the tie-rods 29 are mounted. Then, all paddings, padding 37 inclusive or exclusive, are impregnated with a setting resin which is allowed to set and thereafter the end-winding is tensioned or braced, respectively by means of the tie rods 29 and the azimuthal tightening screw bolts 28 at the outside ring 25. Finally, the outside ring 25 and the inside ring 9 are locked by means of not illustrated cords or filling pieces placed against the winding and the resonance behaviour of the stator is checked by means of a control modal-analysis and if necessary changed by an adjusting of the tension or a further tightening or bracing, respectively.

Due to the fact that the inside ring can be braced axially by means of the tie rods and specifically to the large surface contact acting upon the outside and inside ring systems, an extraordinary stiff and rigid structure having resonance frequencies which are substantially above the possible exciting frequencies occuring during normal operation is arrived at in spite of the fact that the disclosed stator end-winding system can be easily disassembled.

Figure 3:
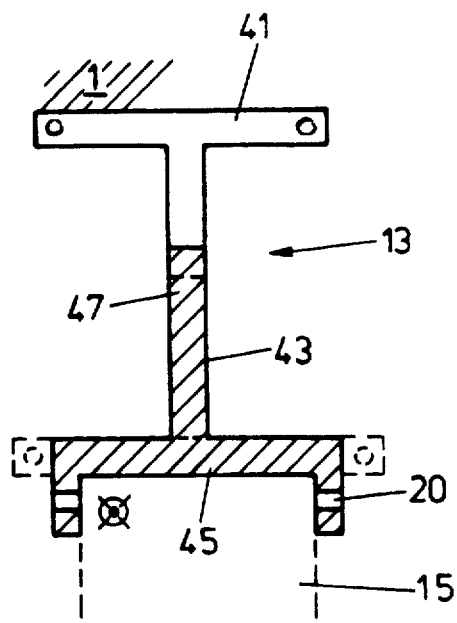
FIG. 3 a embodiment of a variant connecting angle between the body of the stator and the outer ring system of FIG. 1.

In FIG. 1 a preferred embodiment of the connectors 13 is illustrated. FIG. 3 illustrates a section through one connector thereof. The connector 13 includes an upper laterally extending anchor beam 41 which, when mounted, extends azimuthally and is bolted to the stator body 1 and which acts in the axial direction as a leaf spring. A connecting plate 43 arranged to form a T with upper beam 41 visible in FIG. 1, connects the lateral beam 41 to a lower anchor plate 45 having the shape substantially of a "U", which latter, according to FIG. 1, is bolted to a bracket plate 15. The plate 43 can be provided with a recess 47 (see also FIG. 1)

According to a further variation of the embodiments it is also possible to forsee existing supporting angles as connector 13 which are mounted to the body 1 of the stator via pressure springs such that additionally or alone, due to the action of the pressure springs the necessary axial moveability between the braced array of the bars of the winding and the body 1 of the stator is allowed.

A simple possibility for an absorbing of a thermally caused expansion of the bars relative to the stator body 1 is to support the screw bolts 19 (FIG. 1) in the corresponding bores in the connector and/or in the bracket plates 15 in rubber elastic sleeves which absorb resiliently the mentioned axial displacements and at the same time guide the bracket plates 15 azimuthally in the U-shaped plates 45 as longitudinal guides, azimuthally stiff.

The bracket plates 15 can also be supported freely slidable in the U-shaped plates 45 acting as guides; in such cases the screw bolts 19 are not present. Further in this case the plates 15 may be advantageously shaped with outer surfaces 23 parallel to axis A.

This means that then the sliding lower surface of plate 45 of connector 13 is parallel to the axis A. Therefore, both, connectors 13 and bracket plates 15 have to be replaced. The new connectors, with such parallel surfaces, can be mounted to the core 1 as the replaced ones. The new connectors 13 may be made of non-magnetic material, especially of stainless steel or of fibre glass or of a combination of both.

Figure 4:
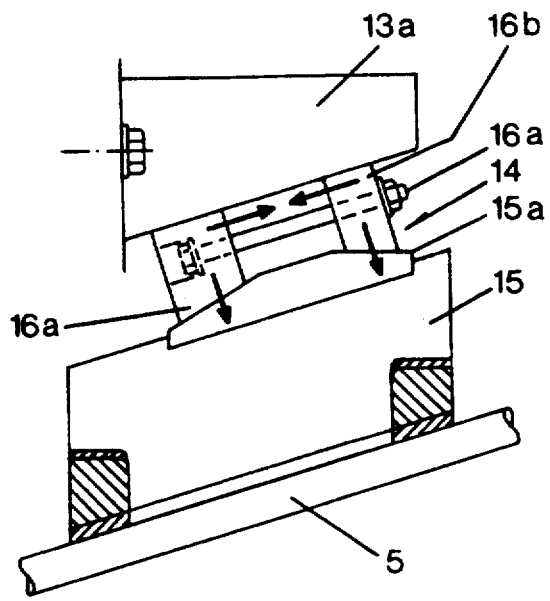
FIG. 4 is a partial view of a further embodiment of the inventive end-winding system.

FIG. 4 illustrates a portion of a further embodiment of the inventive stator end-winding system, namely without an outer ring and without tie-rods. In this embodiment a modified angular member 13a is mounted via screw bolts to the stator body 1 which is not illustrated in detail. A bracket plate 15 is allocated to every angular member 13a which includes a transmitter member 15a. A bracing system 14 is forseen in the angular member 13a which may be a spring system or as illustrated a wedge system which braces the bracket plate 15 against the bars 5. This illustrated bracing device absorbs axial changes of the dimensions of the stator without loss of its effectiveness. The illustrated embodiment includes two wedges 16a, 16b which are driven by tensioning bolt 16c in opposite directions and brace (i.e., urge) the bracket plate 15 radially inwards.

Figure 5:
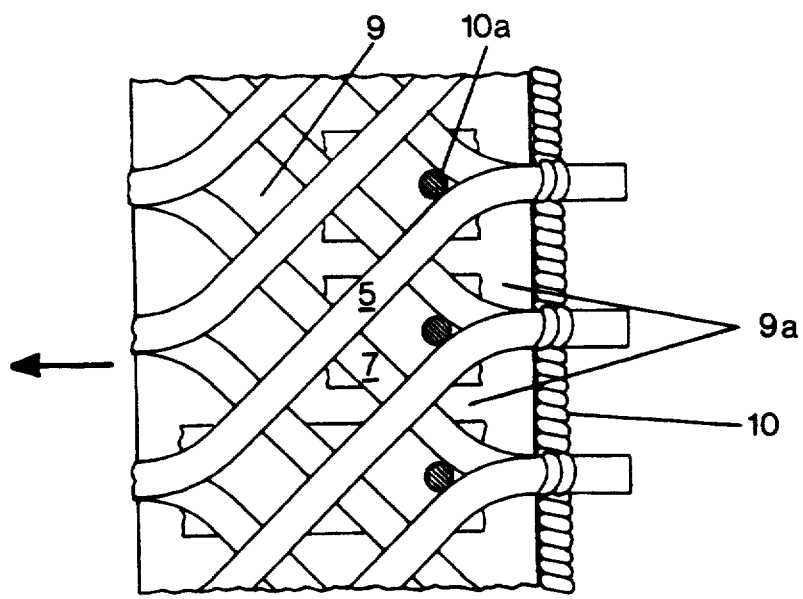
FIG. 5 is a partial view of a still further embodiment of the inventive end-winding system, preferably combined with the embodiment according to FIG. 4 or to FIG. 1.

The illustration of a stator end-winding system in FIG. 5 discloses how the inside ring 9 can be axially braced in the shown direction and be arrested without connection to an outside supporting system such as formed by the outside rings or bracing bars. The inside ring 9 is thereby axially braced towards the inside by the cord system 10 which is rigidly arranged at the bars 5, 7 and/or safety pins 10a are inserted in slide bars 9a which pins 10a claw into the bars. After the inside ring 9 has been pressed into the end-winding in the indicated direction the inside ring 9 is possibly glued to the slide bars 9a.

Preferably, the two embodiments according to FIGS. 4 and 5 may be combined.

For the axial bracing of the inside ring 9 it is possible to forsee wedge and/or spring systems acting axially onto the inside ring instead of the measures of FIG. 5.

While there are shown and described present preferred embodiments of the invention, it is to be distinctly understood that the invention is not limited thereto, but may be otherwise variously embodied and practiced within the scope of the following claims.

I claim:

1. A method of retrofitting a supporting assembly for a stator end winding system of an electric machine, having an array of stator winding bars arranged about an axis of the machine and extending outwardly from one end of a core of the machine, said stator winding bars collectively defining a hollow cone-shaped configuration having an inner and outer cone surface, the cone-shaped configuration having a longitudinal axis substantially coaxial with said machine axis and an original support system for supporting said stator winding bars, said method comprising the steps of:
    (a) removing at least a portion of said original support system;
    (b) inserting into said cone-shaped configuration an inside bracing arrangement comprising a ring having a cone-shaped outer surface substantially conforming to said inner cone surface;
    (c) providing an outside bracing arrangement for supporting the stator winding array comprised of a plurality of interconnectable members;
    (d) positioning the members of said outside bracing arrangement about the outer cone surface of said stator winding array;
    (e) providing fastening means for coupling the interconnectable members and which permit subsequent uncoupling to enable removal of the outside bracing arrangement for subsequent maintenance and repair without disassembly of the stator winding array; and
    (f) interconnecting said inside and outside bracing arrangements to clamp the stator winding array bars therebetween while enabling the bars to experience expansion and contraction in the direction of said longitudinal axis while maintaining the desired clamping action upon said stator winding array.

2. The method of claim 1 further comprising the steps of:
    disassembling said outside bracing arrangement by removing said fastening means and at least a portion of said interconnectable members to provide access to the stator winding array for repair and maintenance without disassembly of the stator winding array.

3. The method of claim 2 further comprising the steps of:
removing the inside bracing arrangement by withdrawing said ring from the stator winding array to enable maintenance and repair of the stator winding array.

4. The method of claim 3 further comprising the steps of repeating steps (a) through (f) upon completion of maintenance and repair of the stator winding array.

5. The method of claim 1 wherein step (c) further comprises the steps of:
providing an outside ring system comprised of interconnectable ring segments;
providing tensioning elements for coupling said ring segments; and
coupling said ring segments so that they encircle the stator winding array and exert a force upon said winding array directed radially inward toward said longitudinal axis.

6. The method of claim 5 wherein step (f) further comprises the step of interconnecting said outside ring system to said inside bracing arrangement.

7. The method of claim 1 further comprising the steps of:
providing spring members for said outside support system; and
positioning said spring members between said outside bracing arrangement and said outer cone surface to facilitate clamping of said stator winding array between said inside and outside bracing arrangements while allowing expansion and contraction of said bars.

8. The method of claim 1, further comprising the step of applying padding material between said outer bracing arrangement and said array of bars forming said hollow cone.

9. The method of claim 7 wherein said bars of said stator winding array form two concentric hollow cones disposed one within the other, and further comprising the step of introducing padding material between said two hollow cones.

10. The method of claim 1, further comprising the steps of:
introducing a filler material into at least one of the locations including a region between said bars, a region between said bars and said outer bracing arrangement, and a region between said bars and said inner bracing arrangement; and
impregnating said material with a resin.

11. The method of claim 1, further comprising the step of securing said outer side bars by fastening cords thereto.

12. The method of claim 1, further comprising the step of finally controlling the resonance behavior of said retrofitted stator end winding system by performing a modal analysis of the stator end winding system and adjusting the resonance behavior of said retrofitted stator end winding system by adjusting the bracing forces applied to the stator winding array of at least one of said inside and outside bracing arrangements to adjust the natural resonance of the stator end winding system to a value greater than the exciting frequencies conventionally encountered directing normal operation of the electric machine.

13. The method of claim 1, further comprising the step of providing a slidable connection between said outside bracing arrangement and said core of said electric machine.

14. The method of claim 1, further comprising the step of providing a substantially rigid connection between said core of said electric machine and said outside bracing arrangement, including providing connecting members chosen to have an elasticity to provide a resilient spring-like behavior between said core and said outside bracing arrangement.

15. The method of claim 1, further comprising the steps of:
providing a slidable connection between said core of said machine and said outside bracing arrangement, said slidable connection including a pair of wedge-shaped members slidable toward and away from one another between a pair of guides to respectively increase or decrease the distance between the stator winding array and the outside bracing arrangement; and
adjusting the positions of said wedge-shaped members to thereby adjust the bracing force applied to the stator winding array by the outside bracing arrangement.

16. The method of claim 15, including coupling said wedge-shaped members with adjustable tensioning means and said adjusting step comprises adjusting said tensioning means.

17. The method of claim 1, wherein the bars are additionally supported by inserting filler material therebetween.

18. The method of claim 1 further comprising the step of providing additional support for the bars by wrapping cords about the bars.

19. A method of retrofitting a supporting assembly for a stator end winding system of an electric machine, having an array of stator winding bars arranged about an axis of the machine and extending outwardly from one end of a core of the machine, said stator winding bars collectively defining a hollow cone-shaped configuration having an inner and outer cone surface, the cone-shaped configuration having a longitudinal axis substantially coaxial with said machine axis and an original support system for supporting said stator winding bars, said method comprising the steps of:
(a) removing at least a portion of said support system;
(b) inserting into said cone-shaped configuration an inside bracing arrangement comprising a ring having a cone-shaped outer surface substantially conforming to said inner cone surface;
(c) providing an outside bracing arrangement for supporting the stator winding array comprised of a plurality of interconnectable members;
(d) positioning the members of said outside bracing arrangement about the outer cone surface of said stator winding array;
(e) providing fastening means for coupling the interconnectable members and which permit subsequent uncoupling to enable removal of the outside bracing arrangement for subsequent maintenance and repair without disassembly of the stator winding array; and
(f) coupling cord means to said stator winding bars to cause the inside bracing arrangement to exert a bracing force upon said stator winding array for clamping the stator winding array bars between said inside and outside bracing arrangements while enabling the bars to experience expansion and contraction in the direction of said longitudinal axis while maintaining the desired clamping action.

* * * * *

UNITED STATES PATENT AND TRADEMARK OFFICE
CERTIFICATE OF CORRECTION

PATENT NO. : 5,140,740
DATED : August 25, 1992
INVENTOR(S) : KLAUS WEIGELT

It is certified that error appears in the above-identified patent and that said Letters Patent is hereby corrected as shown below:

Column 3, line 48, change "aximuthal" to --azimuthal--

Column 4, line 2, change "excerted" to --exerted--

Column 6, line 27, change "a embodiment" to -- is an embodiment --

Column 7, line 6, change "9" to --9'--

Column 8, line 61, after "bars" insert --are--

Signed and Sealed this

Fourteenth Day of September, 1993

Attest:

BRUCE LEHMAN

*Attesting Officer*   *Commissioner of Patents and Trademarks*